No. 862,354. PATENTED AUG. 6, 1907.
C. G. STEVENS.
MONOCULAR CAMERA.
APPLICATION FILED MAR. 31, 1906.
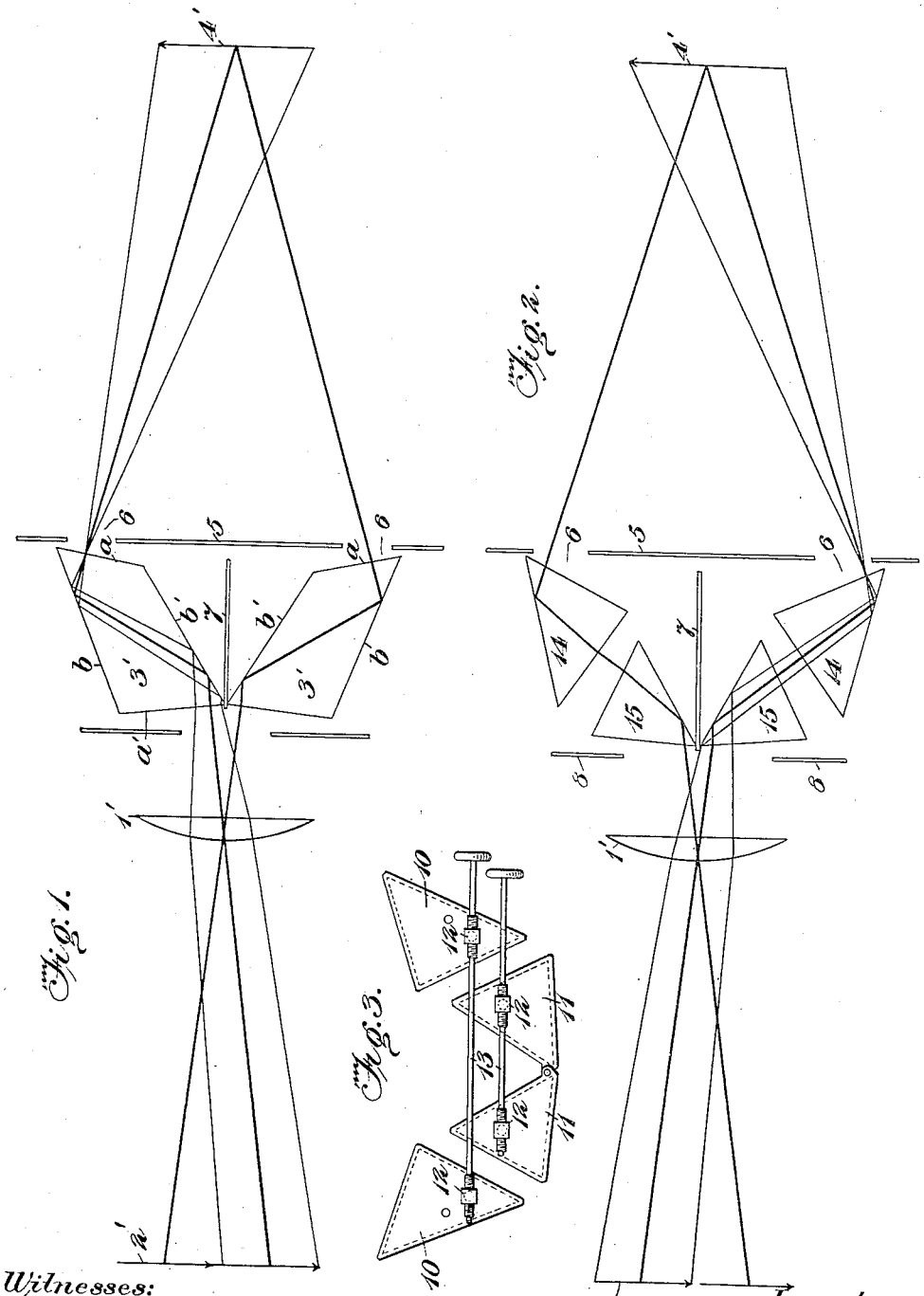

UNITED STATES PATENT OFFICE.

CALVIN G. STEVENS, OF OSBORNE, KANSAS, ASSIGNOR TO BERTHA G. STEVENS, OF OSBORNE, KANSAS.

MONOCULAR CAMERA.

No. 862,354.   Specification of Letters Patent.   Patented Aug. 6, 1907.

Application filed March 31, 1906. Serial No. 309,191.

*To all whom it may concern:*

Be it known that I, CALVIN G. STEVENS, of Osborne, in the county of Osborne, in the State of Kansas, have invented new and useful Improvements in Monocular Cameras, of which the following, taken in connection with the accompanying drawings, is a full, clear, and exact description.

This invention relates to photography, and refers more particularly to certain prisms for reflecting separate bundles of rays of light from the object through a monocular lens, and upon a sensitized surface.

My main object is to impress by a single exposure upon the sensitized surface of a monocular camera two separate pictures of the same object, one as seen by the right eye and the other as seen by the left eye.

Another object is to so relatively arrange the active faces of the reflecting prisms, for each separate bundle of rays of light as to restrict the field of view to prevent overlapping of the right and left eye images of the stereograph.

A further object is to arrange said prisms in such relation to the object and lens as to correct chromatic aberrations of the prisms to project all of the rays reflected on account of critical angles of the prism, within the range of the lens.

A still further object is to provide means for achromatizing and bringing such prisms into proper relation with the lens for different conjugate foci.

Other objects and uses will be brought out in the following description.

In the drawings—Figures 1 and 2 are diagrammatic views showing different adaptations of my invention to a monocular-lens-camera; Fig. 1 showing quadrilateral prisms for producing a stereogram, or two pictures of the same object, one as seen by the left eye, and the other as viewed by the right eye; while in Fig. 2 I have shown similar pairs of triangular prisms for producing the same photographic effect as the device seen in Fig. 1. Fig. 3 is an inverted plan of the means for effecting the adjustment of the prisms seen in Fig. 2.

In Fig. 1 I have shown diagrammatically a monocular camera having a lens —1'; a sensitized plate —2'—, and a pair of quadrilateral prisms 3'—3' which are interposed between the lens and object, as —4'—, to be photographed. The prisms —3'— are located equidistant from and at opposite sides of the optical axis of the lens —1'— with their front and rear faces at substantially right angles to the principal entrance and exit rays of light from the object for the purpose of obviating color aberrations. In other words, these prisms are achromatized with the object at a fixed distance from the camera, and are positioned so that separate bundles of rays enter their front faces a distance apart corresponding to the normal pupilary distance of the eyes, as controlled by a suitable apertured screen —5—, which is arranged in close proximity to the front faces of the prisms, and is provided with apertures —6— and 6 through which the rays of light are projected to their respective prisms. These apertures —6 and 6— are normally spaced a pupilary distance apart, corresponding to the position of the two eyes, but this distance may be varied slightly without destroying the achromatism of the prisms, or materially varying the field of vision, as defined by the critical angle of the prism. These prisms 3'—3' are identical in structure, but are mounted in reverse order upon their respective supports with their four sides in substantially vertical planes, the front and rear sides, as $a$—$a$ and $a'$ $a'$— of each prism constituting the refracting faces, while the other two sides, as the outer side —$b$— and the inner side $b'$— constitute reflecting faces, and may be coated with any suitable opaque film to increase their reflecting power. As previously stated, these prisms are especially constructed to receive the rays of light from the object at a fixed distance from the lens and to project such rays through the lens and onto the sensitized surface —2'— without perceptible color aberration, that is, the front refracting faces —$a$— are disposed respectively at substantially right angles to the principal entrance rays, while the rear refracting faces —$a'$ and $a'$— are disposed at substantially right angles to the exit rays $n$.

The critical angle of the prism is such, and the outer faces —$b$— of these prisms are disposed at such an angle with their respective front faces —$a$—, that rays from without the boundaries of the field adapted to the photographic plate and focus of the lens employed are not reflected after refraction at the surfaces —$a$—$a$—, and hence do not pass to the lens —1—, thereby defining the margins of the right eye and of the left eye images. The inner sides, as $b'$—, of the prisms are disposed at such an angle as to reflect the principal rays of light projected thereto at substantially right angles to the rear refracting faces $a'$— to preserve the achromatism of the prisms.

The prisms 3'—3' are preferably separated by an intervening opaque partition —7— to prevent passage of any light rays from one prism to the other, and the projected rays of light passing through the prisms are additionally confined by a transverse screen —8— between the prisms and lens, the screen —7— being disposed in a vertical plane midway between the adjacent faces of the prisms 3'—3'.

The monocular camera seen in Fig. 1 is adjusted for the production of stereograms, or two pictures side by side of the same object, one as seen by the right eye and the other as seen by the left eye so that prints may be made directly from the stereogram for use with the stereoscope without the usual cutting and rejoining, and when placed in a stereoscope, a single stereoscopic picture, accurate in all its details, is given.

In the device hereinbefore described, I use quadrilateral prisms, but it is evident to those skilled in the art, that the achromatic effect, as well as the limitations of the field by the critical angle may be produced by combinations of prisms, such for instance, as those shown in Fig. 2. In each and all cases, however, the prism, or combination of prisms for each eye, has at least, two refracting and two reflecting sides or surfaces.

In Fig. 2 I have shown a system of prisms 14—14— and 15—15, adjusted for projecting the rays of light from the object, as 4'—, through a lens 1' and upon a sensitized plate of film 2' so as to produce a stereograph, or two pictures of the same object, side by side, one as viewed by the right eye and the other as seen by the left eye. Unnecessary rays of light passing to the prisms 14—14 and 15—15 are shut out of the prisms by suitable screens —5—, 7—, and —8—, similar to those seen in Fig. 1, the screen —5— being located in proximity to the front faces of the prisms —14— and provided with suitable apertures —6— through which the light passes and enters the front faces of the prisms at substantially right angles thereto, a distance apart according to the pupilary distance of the two eyes looking at the object, while the rear faces of the prisms —15—15— are disposed at substantially right angles to the principal exit rays. The critical angle of the outer faces of the prisms 14— is such as to restrict the field and confine the projected rays within the limits of the photographic plate 2' and to prevent overlapping of the two pictures at the center of such plate, the other sides of the prisms being so relatively disposed to each other as to cause the projection and impression of the separated bundles of rays of light from the object at opposite sides of the optical axis of the lens or center of the sensitized plate. These prisms 14—14— and 15—15— may be mounted for horizontal adjustment the adjusting mechanism being clearly illustrated in Fig. 3. The prisms 14— may be mounted upon suitable supports —10— mounted for oscillation while the prisms 15— may be mounted upon similar rocking supports —11—, the supports —11— being preferably hinged at their meeting edges, and each pair of the supports are provided with right and left-hand nuts —12— swiveled upon the supports, which are engaged by separate rods 13 having right and left-hand screw threaded portions engaging the nuts whereby the prisms may be simultaneously adjusted or rocked horizontally in opposite directions to bring them in proper relation with the lens for objects at different distances without destroying the achromatic or critical angle effects.

What I claim:

1. A monocular camera of the class described, comprising a single lens and a sensitized element, and separate reflecting prisms located at opposite sides of and equidistant from the optical axis of the lens, each prism being achromatic, said prisms having their initial reflecting sides disposed at such an angle as will define the marginal field of the object, and confine the totally reflected rays within the limits of the sensitized element.

2. A monocular camera of the class described, comprising a single lens and a sensitized element, and a system of reflecting prisms having portions thereof arranged at one side of the optical axis of the lens and similar portions arranged at the opposite side of said axis, the light receiving sides of the opposite prisms being disposed a distance apart corresponding to the pupilary distance of the eyes when viewing the object.

3. A monocular camera of the class described, comprising a single lens and a sensitized element, and two opposite reflecting prisms having portions of their light-receiving sides spaced apart a distance substantially equal to the pupilary distance of the two eyes when viewing the object and at substantially right angles to the principal rays of light from the object.

4. A monocular camera of the class described, comprising a single lens and a sensitized element, and two opposite reflecting prisms having portions of their light-receiving sides spaced apart a distance substantially equal to the pupilary distance of the two eyes when viewing the object, and at substantially right angles to the principal rays of light from the object and their initial reflecting sides disposed at such angle as will define the field of the object.

In witness whereof I have hereunto set my hand this 5th day of March, 1906.

CALVIN G. STEVENS.

Witnesses:
H. E. CHASE,
MILDRED M. NOTT.